United States Patent
Varenne et al.

(12) 
(10) Patent No.: US 12,359,580 B2
(45) Date of Patent: Jul. 15, 2025

(54) TURBINE ENGINE FOR AN AIRCRAFT

(71) Applicant: SAFRAN AIRCRAFT ENGINES, Paris (FR)

(72) Inventors: Victor Henri Marius Varenne, Moissy-Cramayel (FR); Arnaud Baudran, Moissy-Cramayel (FR); Antoine Jean-Philippe Beaujard, Moissy-Cramayel (FR); David René Pierre Le Cair, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/839,141

(22) PCT Filed: Feb. 20, 2023

(86) PCT No.: PCT/FR2023/050240
§ 371 (c)(1),
(2) Date: Aug. 16, 2024

(87) PCT Pub. No.: WO2023/161582
PCT Pub. Date: Aug. 31, 2023

(65) Prior Publication Data
US 2025/0154876 A1    May 15, 2025

(30) Foreign Application Priority Data
Feb. 22, 2022 (FR) .................... 2201543

(51) Int. Cl.
*F01D 9/06* (2006.01)
*F01D 25/12* (2006.01)

(52) U.S. Cl.
CPC ............ *F01D 9/065* (2013.01); *F01D 25/12* (2013.01); *F05D 2220/323* (2013.01);
(Continued)

(58) Field of Classification Search
CPC ... F01D 5/08; F01D 9/06; F01D 25/12; F01D 25/16; F01D 9/065; F02C 7/12;
(Continued)

(56) References Cited

U.S. PATENT DOCUMENTS

| 2005/0172640 A1* | 8/2005 | Drevs | F04D 29/584 |
| | | | 60/785 |
| 2011/0079019 A1* | 4/2011 | Durocher | F01D 25/162 |
| | | | 60/796 |

(Continued)

FOREIGN PATENT DOCUMENTS

| CA | 2940708 A1 | 6/2017 |
| FR | 2858649 A1 | 2/2005 |

(Continued)

OTHER PUBLICATIONS

International Search Report in corresponding International Patent Application No. PCT/FR2023/050240, mailed Mar. 28, 2023, 1 page, English Translation only.

*Primary Examiner* — Todd E Manahan
*Assistant Examiner* — Rodolphe Andre Chabreyrie
(74) *Attorney, Agent, or Firm* — Cozen O'Connor (57) ABSTRACT

A turbomachine—for aircraft has a primary annular flow path and a cold flow channel extending around the primary annular flow path. The turbomachine includes an impeller, a compressor, a combustion chamber, a first turbine having a first turbine rotor, a second turbine having a second turbine rotor, a first connecting shaft and a second connecting shaft, an inter-turbine stator arranged between the first turbine and the second turbine, and a first cooling circuit having successively: a first cooling inlet located between the impeller and the compressor, a first passage extending into the inter-turbine stator, and a first cooling outlet extending into the cold flow channel.

14 Claims, 5 Drawing Sheets

(52) U.S. Cl.
CPC ............... *F05D 2260/213* (2013.01); *F05D 2260/2212* (2013.01); *F05D 2260/22141* (2013.01)

(58) Field of Classification Search
CPC ............... F02K 3/06; F05D 2220/323; F05D 2260/213; F05D 2260/2212; F05D 2260/22141
See application file for complete search history.

(56) References Cited

U.S. PATENT DOCUMENTS

| | | | |
|---|---|---|---|
| 2015/0330249 A1* | 11/2015 | Budnick | ............... F01D 25/14 415/116 |
| 2015/0330250 A1 | 11/2015 | Scott et al. | |
| 2015/0345400 A1 | 12/2015 | Scott et al. | |
| 2018/0045074 A1* | 2/2018 | Sinha | ............... F04F 5/30 |
| 2023/0036206 A1* | 2/2023 | Johnson | ............... F01D 5/085 |

FOREIGN PATENT DOCUMENTS

| | | |
|---|---|---|
| FR | 3097907 A1 | 1/2021 |
| WO | 2014143329 A2 | 9/2014 |

\* cited by examiner

TURBINE ENGINE FOR AN AIRCRAFT

CROSS-REFERENCE TO RELATED APPLICATIONS

This application is a US National phase Application of PCT/FR2023/050240 filed Feb. 20, 2023, which claims priority to French Patent Application No. 2201543 filed Feb. 22, 2022, both of which are hereby incorporated in their entirety.

BACKGROUND

The present disclosure relates to a turbomachine for aircraft and more particularly to the cooling of the turbomachine.

PRIOR ART

A turbomachine for aircraft is known wherein the turbomachine is intended to propel, towards a downstream side, a flow of air entering from an upstream side and thus move the aircraft forward.

Document FR 2 858 649 A1 describes such a turbomachine.

The turbomachine has a primary annular flow path and a cold flow channel extending around the primary annular flow path, said turbomachine comprising:
- an impeller arranged upstream of a first annular wall, the first annular wall separating the primary annular flow path from the cold flow channel,
- in the primary annular flow path, from upstream to downstream, a compressor, a combustion chamber, a first turbine arranged downstream of the combustion chamber, a second turbine arranged downstream of the first turbine, the compressor having an input stage and an output stage, the first turbine having a first turbine rotor and the second turbine having a second turbine rotor,
- a shaft assembly for rotating the compressor and the impeller about an axis of rotation, the shaft assembly comprising a first connecting shaft and a second connecting shaft, the first connecting shaft being rotatably connected to the second turbine rotor, the second connecting shaft being rotatably connected to the first turbine rotor,
- an inter-turbine stator disposed between the first turbine and the second turbine, the inter-turbine stator comprising a plurality of arms extending between an inner end and an outer end, the plurality of arms passing through the primary annular flow path.

The term "cold flow channel" is to be understood as a channel, especially an annular flow, which is not located downstream of a combustion chamber.

The temperature in the primary annular flow path downstream of the combustion chamber is high. Cooling the turbomachine requires taking some of the air from the turbomachine and passing it in contact with the mechanical elements to be cooled. When the cooling air is released, its pressure is lower than when it is drawn off. The amount of air used for cooling must therefore be controlled so as not to penalise the performance of the turbomachine.

In order to increase the robustness and reduce the manufacturing cost (by using material with lower thermal resistance requirements) and fuel consumption of the turbomachine, the present disclosure aims at improving the cooling of the turbomachine.

SUMMARY

To remedy the above problems, according to the disclosure, the second connecting shaft rotates the compressor and the turbomachine includes a cooling assembly, the cooling assembly comprising a first cooling circuit having successively:
- a first cooling inlet located between the impeller and the compressor,
- a first passage extending through the primary annular flow path into the inter-turbine stator from the inner end to the outer end, and
- a first cooling outlet extending into the cold flow channel.

Cooling requires compromises between the pressure and temperature of the air for cooling. The further upstream the air is taken from the primary annular flow path, the lower the temperature and the lower the pressure. Depending on the operating conditions of the turbomachine, with the first cooling inlet located upstream of the compressor, the pressure at the first cooling outlet may be higher outside the cooling circuit than inside the cooling circuit. It is therefore possible that, temporarily, the first cooling circuit does not fulfil its cooling function. However, if the direction of flow in the first cooling circuit is reversed and the temperature in the cold flow channel is substantially lower than the temperature in the primary annular flow path downstream of the combustion chamber and relatively close to the temperature at the first cooling inlet, this is acceptable.

In addition, the first passage allows the inter-turbine stator to be cooled.

Preferably, the first circuit comprises, between the first cooling inlet and the first passage, a first cooling space extending in contact with the second connecting shaft.

This reduces the risk of the second connecting shaft being subjected to a high temperature that could damage it, when the pressure downstream (outside) of the first cooling outlet is higher than the pressure inside the cooling circuit.

According to a further feature, the cooling space preferably extends between the first connecting shaft and the second connecting shaft.

This reduces the risk of the second connecting shaft being subjected to a high temperature that could damage it, when the pressure downstream (outside) of the first cooling outlet is higher than the pressure inside the cooling circuit.

According to another feature in accordance with the disclosure, preferably the cooling assembly further comprises a second cooling circuit, the first cooling circuit and the second cooling circuit are separate, the first cooling circuit being fluidly sealed from the second cooling circuit, the second cooling circuit comprises successively:
- a second cooling inlet located downstream of the inlet stage of the compressor,
- a second passage extending through the primary annular flow path in the inter-turbine stator from the outer end to the inner end,
- a second cooling outlet extending into the primary annular flow path downstream of the first turbine.

Thus, the second cooling circuit has its own pressure characteristics, allowing other parts of the turbomachine to be cooled without degrading the cooling provided by the first cooling circuit.

Preferably, the second cooling circuit comprises a second cooling space extending in contact with the second turbine rotor to cool it.

As the high-pressure turbine is at a very high temperature, the cooling of the high-pressure turbine tends to bring the air that has cooled the high-pressure turbine to a temperature that may be detrimental to the cooling at the first connecting shaft and the second connecting shaft and/or to a pressure that may be higher than the pressure at the first cooling inlet. By keeping the first cooling circuit and the second cooling circuit physically separate (i.e. not mixing air from the first cooling circuit and air from the second cooling circuit), but creating heat exchange, the efficiency of the second cooling circuit is improved, while avoiding the risk of reverse flow in the first cooling circuit.

According to a further feature in accordance with the present disclosure, preferably each arm has an internal space, the inter-turbine stator comprises a duct extending into the internal space and, one of the first circuit and the second circuit extends inside the duct, the other of the first circuit and the second circuit extends outside the duct and in contact with the duct, so that the duct acts as a heat exchanger.

Thus, the air circulating in the first cooling circuit, before being evacuated (in the cold flow channel) cools the air circulating in the second cooling circuit, without the pressure in the first cooling circuit being significantly increased (which would be the case in case of mixing).

According to a further feature of the present disclosure, the duct preferably has fins.

The fins increase the heat exchange surface between the duct and the air of the first cooling circuit and/or the air of the second cooling circuit.

In a further complementary or alternative feature in accordance with the present disclosure, the duct preferably has protrusions for creating flow turbulence.

This increases the heat exchange between the duct and the air of the first cooling circuit and/or the air of the second cooling circuit.

According to a further complementary or alternative feature in accordance with the present disclosure, the inter-turbine stator preferably comprises a plurality of ducts extending into the internal space and acting as a heat exchanger.

The fins increase the heat exchange surface between the duct and the air of the first cooling circuit and/or the air of the second cooling circuit.

According to an alternative feature, the plurality of arms comprises first arms and second arms, the first cooling circuit passes through the first arms, the second cooling circuit passes through the second arms, and the first arms are separate from the second arms and arranged between the second arms.

Thus, both the first cooling circuit and the second cooling circuit pass through the primary annular flow path, without interfering with each other.

According to a further feature in accordance with the present disclosure, preferably the first circuit pressurises a bearing lubrication chamber for guiding the first connecting shaft and the second connecting shaft.

This reduces the risk that the lubricant (oil) in the bearings will degrade by coking when the pressure downstream (outside) of the first cooling outlet is higher than the pressure inside the cooling circuit.

In various embodiments of the turbomachine according to the disclosure, one and/or more of the following provisions may optionally be further employed:
the impeller is driven in rotation by the first connecting shaft;
the compressor constitutes a high-pressure compressor, the turbomachine further comprises a low-pressure compressor and the first cooling inlet is located between the low-pressure compressor and the high-pressure compressor;
the low-pressure compressor is driven in rotation by the first connecting shaft.

BRIEF DESCRIPTION OF THE FIGURES

Further features and advantages of the present disclosure will be apparent from the following detailed description, with reference to the annexed drawings wherein.

DETAILED DESCRIPTION

Figure 1:
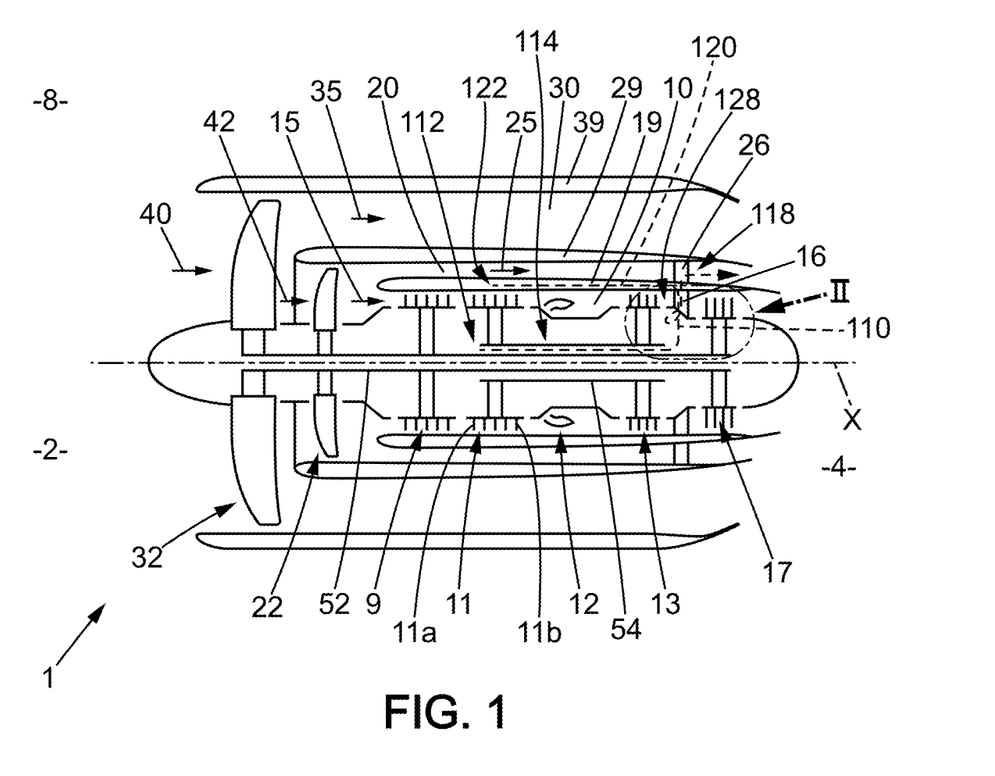
FIG. 1 shows a schematic of a turbomachine in longitudinal section.

FIG. 1 illustrates a turbomachine 1 intended to be mounted on an aircraft to propel an inlet air flow 40 from an upstream side 2 to a downstream side 4 and thereby advance the aircraft in an atmosphere 8 consisting of the surrounding air. The aircraft may be of military or civilian type.

The turbomachine 1 has a longitudinal axis X. The inlet air flow 40 flows generally from the upstream side 2 to the downstream side 4 along the direction of the longitudinal axis X.

The turbomachine 1 essentially comprises a first impeller 22, a second impeller 32, a low-pressure compressor 9, a high-pressure compressor 11, a combustion chamber 12, a first turbine 13 (high-pressure turbine), an inter-turbine stator 16, a second turbine 17 (low-pressure turbine), a secondary stator 26, a first connecting shaft 52 and a second connecting shaft 54. The turbomachine 1 further comprises a first annular wall 19, a second annular wall 29, and a fairing 39. In the illustrated embodiment, the inlet air flow 40 flows within the fairing 39.

After passing through the second impeller 32, the inlet air flow 40 then separates into a tertiary flow 35 and an intermediate air flow 42. The tertiary flow 35 flows in a tertiary annular flow path 30 extending around the second annular wall 29. In the illustrated embodiment, the tertiary flow 35 flows more precisely between the second annular wall 29 and the fairing 39.

The secondary flow 25 and the tertiary flow 35 are cold flows as they do not extend downstream of the combustion chamber 12.

Alternatively, the turbomachine could be devoid of the second impeller 32, the fairing 39 and hence the tertiary annular flow, so that the airflow into the turbomachine would be the intermediate flow 42. In addition, the second annular wall 29 could then be omitted, as well as the secondary stator 26.

The intermediate air flow 42 passes through the first impeller 32, and the intermediate air flow 42 then separates into a secondary flow 25 and a primary flow 15. The secondary flow 25 flows in a secondary annular flow path 20 extending between the first annular wall 19 and the second annular wall 29.

The secondary annular flow path 20 through which the secondary flow 25 flows and the tertiary annular flow path 30 through which the tertiary flow 35 flows are cold flow channels.

The primary flow 15 flows in a primary annular flow path 10 inside the first annular wall 19 and passes through the low-pressure compressor 9 and then the high-pressure compressor 11. The low-pressure compressor 9 is optional. The high-pressure compressor 11 advantageously comprises several successive stages, including an inlet stage 11a and an outlet stage 11b.

After passing through the high-pressure compressor 11, the primary flow 15 flowing in the primary annular flow path 10 enters the combustion chamber 12. In the combustion chamber 12, a fuel is burned.

The primary flow 15 then passes through the first turbine 13, the inter-turbine stator 16 and the second turbine 17. The first turbine 13 comprises a first turbine rotor 14 which is connected to the second connecting shaft 54 and drives the second connecting shaft 54 in rotation about the longitudinal axis X. The first turbine rotor 14 comprises a first disc carrying first blades arranged in the primary annular flow path 10. The longitudinal axis X is the axis of rotation of the second connecting shaft 54. The first turbine 13 may comprise one or more stages.

After flowing through the first turbine 13, namely the blades of the first turbine 13, and thus driving the first turbine rotor 14 in rotation, the primary flow 15 flowing in the primary annular flow path 10 flows through the inter-turbine stator 16 and the second turbine 17. The second turbine 17 through which the primary flow 15 passes comprises a second turbine rotor 18. The second turbine 17 may comprise one or more stages.

The second turbine rotor 18 is connected to the first connecting shaft 52 and rotates the first connecting shaft 52 about the longitudinal axis X. The longitudinal axis X is the axis of rotation of the first connecting shaft 52. The first connecting shaft 52 is connected to the first impeller 22, which it drives in rotation about the longitudinal axis X. In the illustrated embodiment, the first connecting shaft 52 also drives the low-pressure compressor 9 and the second impeller 32. The low-pressure compressor 9, the first impeller 22 and the second impeller 32 form a low-pressure assembly driven in rotation by the first connecting shaft 52. Alternatively, the first impeller 22 could be driven differently. In addition, a gearbox could be provided to reduce the drive speed of the first impeller 22 and/or second impeller 32.

The second turbine rotor 14 is connected to the first connecting shaft 54 and rotates the first connecting shaft 54 about the longitudinal axis X. The longitudinal axis X is the axis of rotation of the first connecting shaft 54. The second connecting shaft 54 is connected to the high-pressure compressor 11, which it drives in rotation about the longitudinal axis X.

Figure 2:
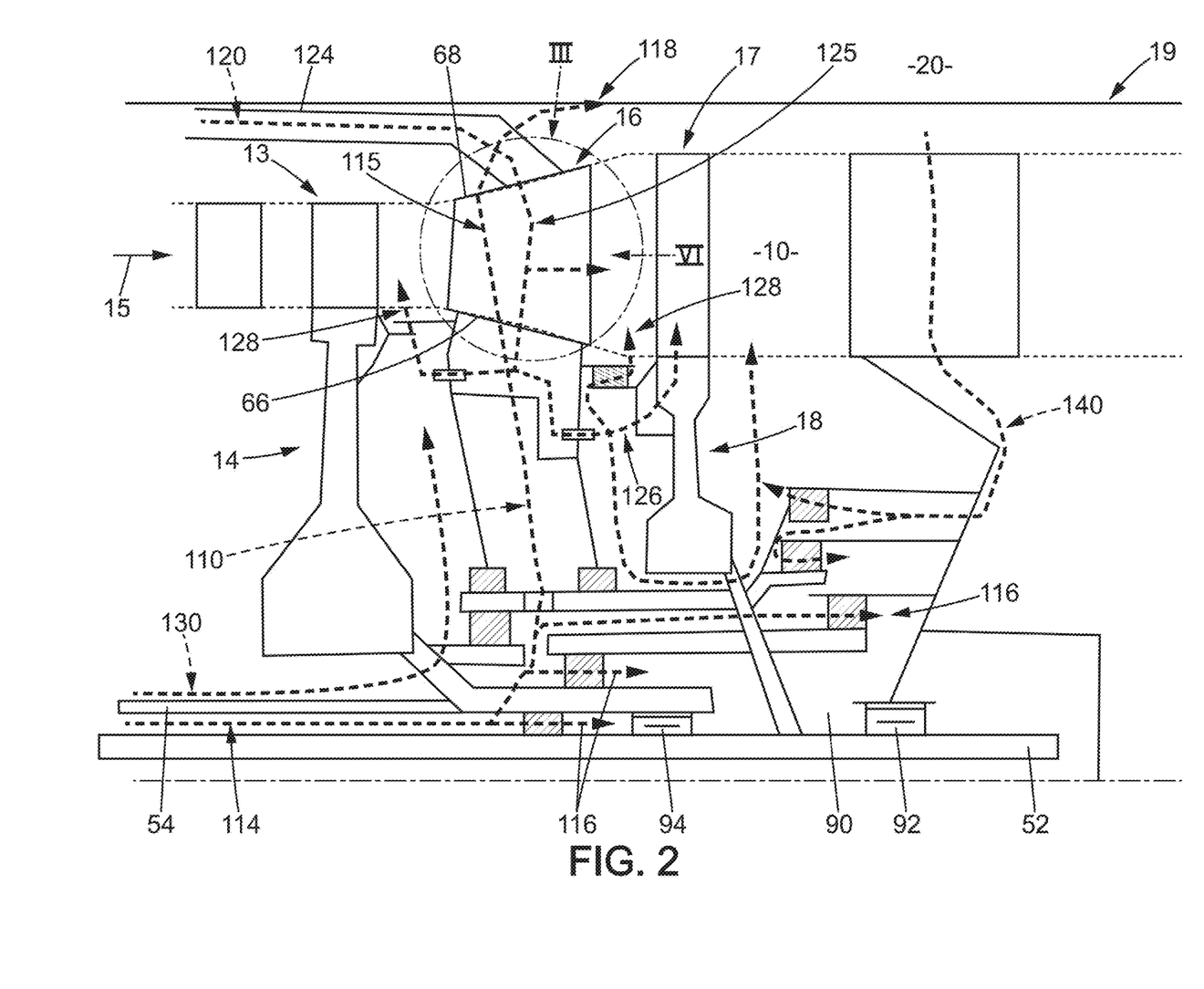
FIG. 2 is a schematic representation on an enlarged scale of the part labelled II in FIG. 1.

As illustrated in FIGS. 1 and 2, the turbomachine 1 further comprises essentially a first cooling circuit 110 and a second cooling circuit 120. As illustrated in FIG. 2, the turbomachine 1 further comprises a third cooling circuit 130 and a fourth cooling circuit 140.

The first cooling circuit 110 successively comprises a first cooling inlet 112, a shaft-cooling space 114, a first passage 115 and a first cooling outlet 118.

The first cooling inlet 112 is located between the first impeller 22 and the high-pressure compressor 11. Specifically, the first cooling inlet 112 is located between the low-pressure compressor 9 and the high-pressure compressor 11. The shaft-cooling space 114 extends between the first connecting shaft 52 and the second connecting shaft 54. The first passage 115 extends through the primary annular flow path 10, specifically into the inter-turbine stator 16. The first cooling outlet 118 is located in the secondary annular flow path 20.

Alternatively, the first cooling outlet 118 could be disposed in the tertiary annular flow path 30, after passing through the primary annular flow path 10, similarly, the first cooling circuit 110 would pass through the secondary annular flow path passing through the secondary stator 26 which may be structurally analogous to the inter-turbine stator 16.

The first cooling circuit 110 further comprises a first auxiliary cooling space 116 located between the first cooling space 114 and the first passage 115. In the illustrated embodiment, the first cooling circuit 110 more precisely several ancillary cooling spaces 116 wherein the first cooling circuit 110 pressurizes a lubrication chamber 90, in order to cool the lubrication chamber 90 and maintain the lubricant contained therein in the lubrication chamber 90. A first bearing 92 and a second bearing 94 are arranged in the lubrication chamber 90. The first bearing 92 is mounted on the first connecting shaft 52 and holds the first connecting shaft 52 relative to the stator inter-shaft 16. The first bearing 92 is mounted on the first connecting shaft 54 and holds the first connecting shaft 54 relative to the stator inter-shaft 16.

The second cooling circuit 120 comprises successively a second cooling inlet 122, an intermediate space 124, a second passage 125 and a second cooling outlet 128.

The second cooling inlet 122 is arranged downstream from the first cooling inlet 112. The second cooling inlet 122 is arranged downstream of the inlet stage 11a of the high-pressure compressor 11. Preferably, the second cooling inlet 122 is arranged upstream of the output stage 11b of the high-pressure compressor 11. In the illustrated embodiment, the intermediate space 124 extends into the second annular wall 29. Alternatively, the intermediate space 124 could in particular project into the secondary annular flow path 20. The second cooling outlet 128 extends into the primary annular flow path 10. The second cooling circuit 120 further comprises a second cooling space 126 disposed between the second passage 125 and the second cooling outlet 128. In the second cooling space 126, air flowing through the second cooling circuit 120 contacts the second turbine rotor 18 to cool it, in particular the disc and blades of the second turbine rotor 18. At the second cooling outlet 128, the second cooling circuit has a so-called purging function, by creating a circulation to the primary annular flow path, the second circuit prevents hot air from the primary annular flow path 10 from entering cavities around the primary annular flow path 10.

In addition, the second cooling circuit 120 optionally cools the first turbine rotor 14.

The first cooling circuit 110 is separate from the second cooling circuit 120, i.e. the air flowing in the first cooling circuit 110 between the first cooling inlet 112 and the first cooling outlet 118 does not mix with the air flowing in the second cooling circuit 120 between the second cooling inlet 122 and the second cooling outlet 128, and vice versa.

Figure 3:
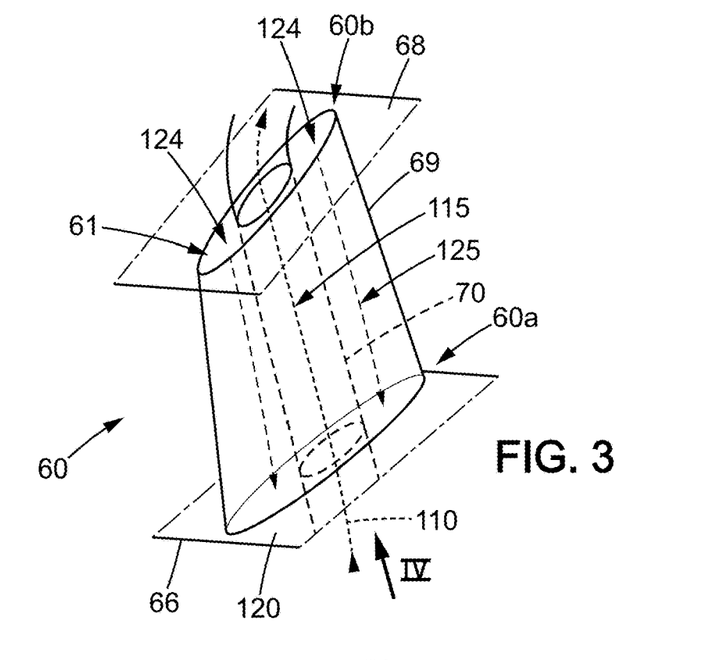
FIG. 3 shows a partial view of a stator, in a further enlarged scale in the area marked III in FIG. 2.

The inter-turbine stator 16 comprises an inner wall 66, an outer wall 68 and arms 60. The inner wall 66 and the outer wall 68 are substantially conical and delimit between them, radially to the axis of rotation X, the primary annular flow path 10 at the inter-turbine stator 16. The arms 60 extend radially to the axis of rotation X between an inner end 60a and an outer end 60b. The inner end 60a of the arms 60 is located at the inner wall 66. The outer end 60b of the arms 60 is located at the outer wall 68.

The arms 60 are hollow and comprise a shell 69 defining an internal space 61. The envelope 69 extends from the inner end 60a to the outer end 60b. The inner wall 66 has an opening facing the inner space 61, so that at the inner end 60a the envelope 69 corresponds to the opening of the inner wall 66. Similarly, the outer wall 68 has an opening facing the inner space 61, so that at the outer end 60b the envelope 69 corresponds to the opening of the outer wall 68.

The arms 60 are angularly distributed, for example eight arms spaced 45 degrees apart.

Figure 4:
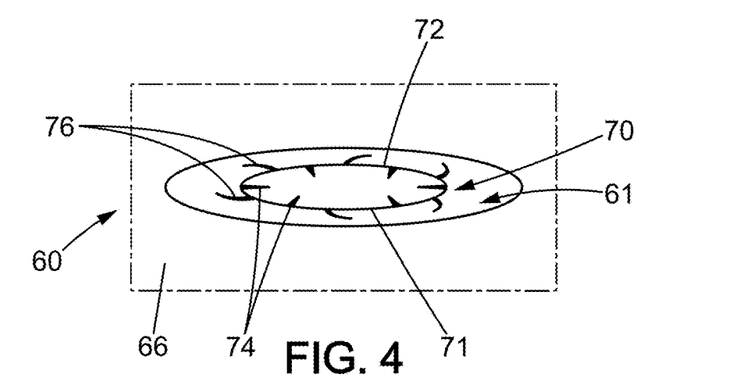
FIG. 4 is a view according to the arrow marked IV in FIG. 3.
Figure 5:
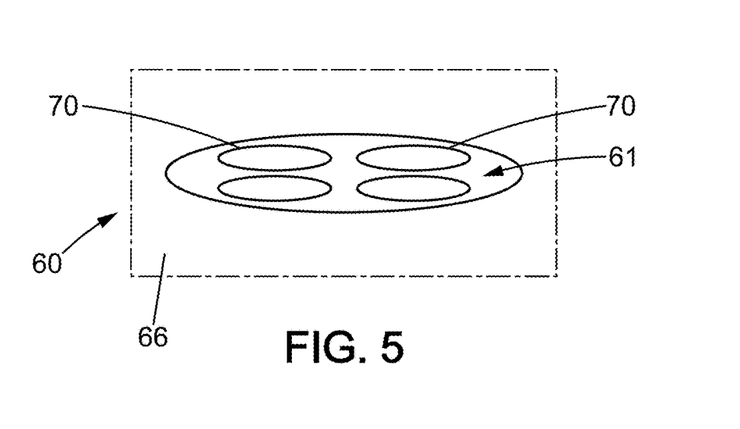
FIG. 5 is a view according to FIG. 4 of an alternative stator design.

In the sample embodiment shown in FIGS. 3 to 5, each arm 60 of the inter-turbine stator 16 further comprises a duct 70 extending into the inner space 61 between the inner end 60a and the outer end 60b, away from the casing 69 and preferably substantially in the centre of the inner space 61.

The duct 70 has an inner surface 71 and an outer surface 72. The first cooling circuit 110 passes through the duct 70, in contact with the internal surface 71. The second cooling circuit 120 passes through the internal space 61, between the casing 69 and the duct 70, in contact with the external surface 72 of the duct 70.

The duct 70 has cooling fins 74 projecting from the inner surface 71 and extending radially to the axis of rotation X. The duct 70 further has protrusions 76 projecting from the outer surface 72, to create a turbulent flow conducive to heat exchange between the duct 70 and the air in the second cooling circuit 120.

Alternatively, the fins 74 could project from the outer surface 72 and or the protrusions 76 could project from the inner surface 72.

According to another variant, the inter-turbine stator 16 could be without the duct, the first passage 115 would extend into the internal space 61, the second passage 125 would extend around the casing 69, but inside a casing, so that with respect to the description above the casing 69 would act as the duct 70 and the casing would act as the casing 69.

In the alternative embodiment shown in FIG. 5, each arm 60 of the inter-turbine stator 16 further comprises a plurality of ducts 70, specifically four ducts 70 extending in parallel into the internal space 61.

Figure 6:
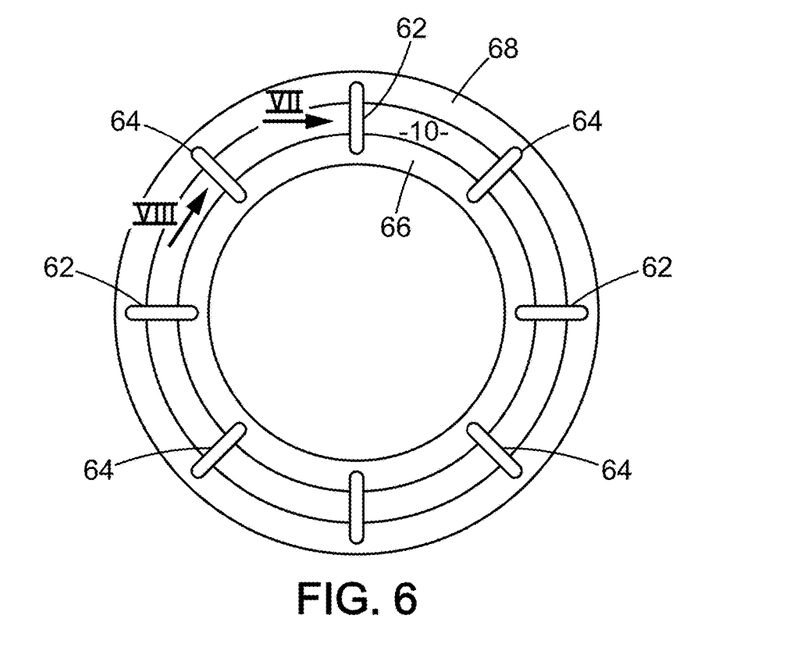
FIG. 6 shows schematically another variant of the stator following the arrow marked VI in FIG. 2.
Figure 7:
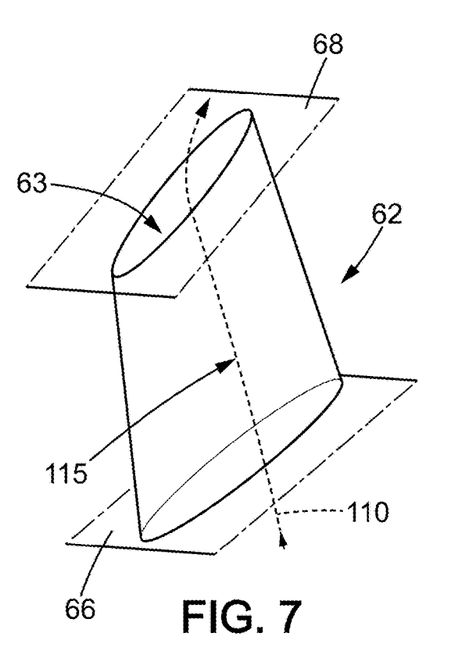
FIG. 7 is a partial view of the other stator variant along the arrow marked VII in FIG. 6.
Figure 8:
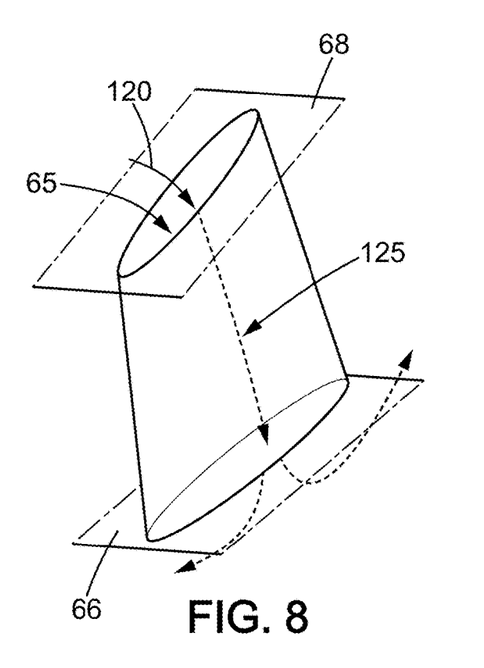
FIG. 8 is a partial view of the other stator variant along the arrow marked VIII in FIG. 6.

In the alternative embodiment shown in FIGS. 6 to 8, the inter-turbine stator arms 16 comprise first arms 62 each having a first internal space 63 and second arms 64 each having a second internal space 65. The inter-turbine stator 16 comprises four first arms 62 angularly spaced by 90 degrees and four second arms 64 angularly spaced by 90 degrees. As illustrated in FIG. 6, the first arms 62 and the second arms 64 are alternately arranged, each first arm 62 being arranged between and equidistant from two second arms 64, and vice versa. The first passage 115 extends into the first internal spaces 63 and the second passage 125 extends into the second internal spaces 65.

Figure 9:
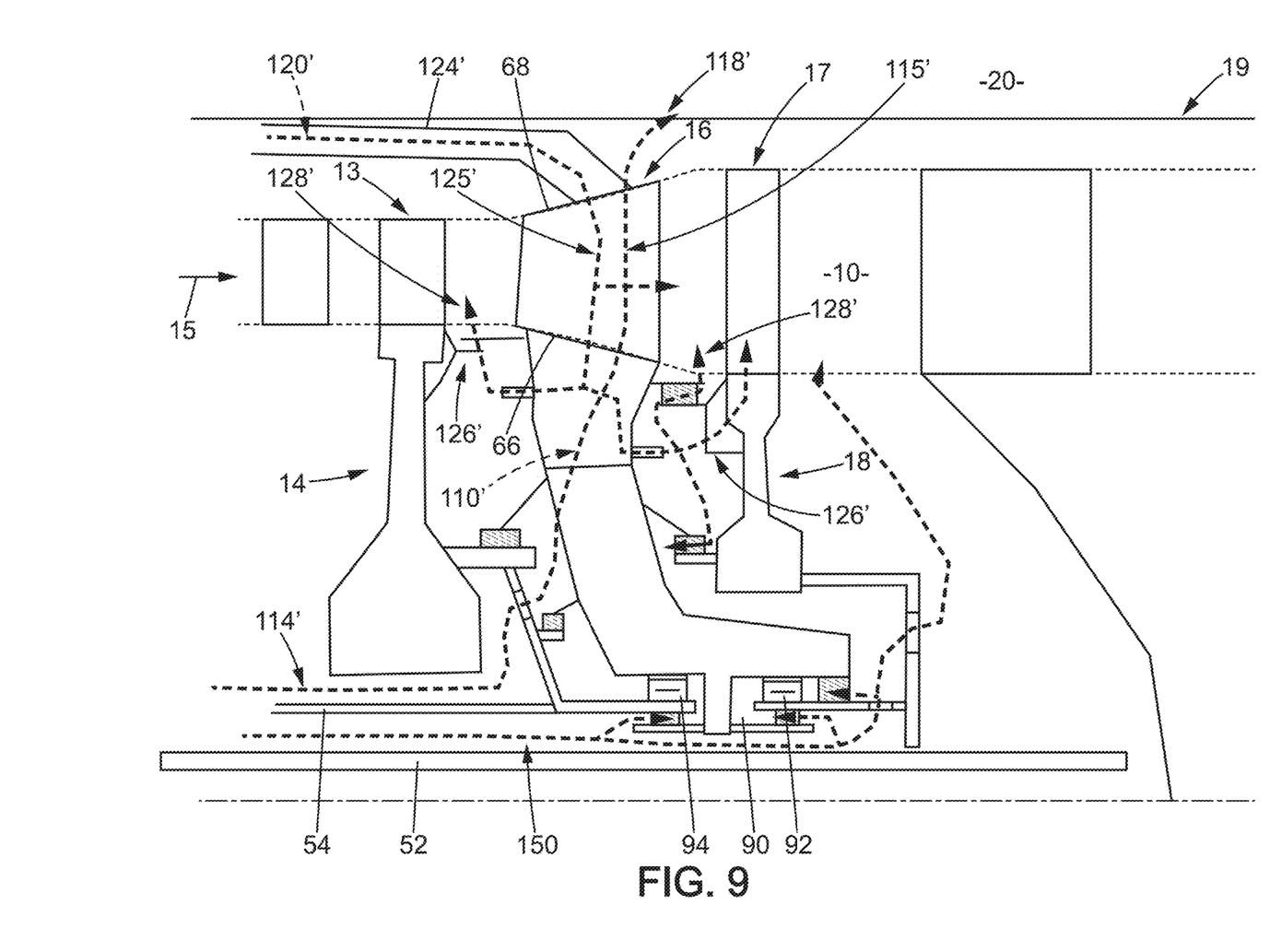
FIG. 9 is a view according to FIG. 2 of an alternative stator design.

In the embodiment shown in FIG. 9, the turbomachine comprises a first cooling circuit 110', a second cooling circuit and a secondary cooling circuit 150. The first cooling circuit 110 successively comprises a first cooling inlet 112, a shaft-cooling space 114, a first passage 115 and a first cooling outlet 118. The second cooling circuit 120' comprises successively a second cooling inlet 122, an intermediate space 124', a second passage 125', a second cooling space 126' and a second cooling outlet 128'. The alternative embodiment shown in FIG. 9 differs from the embodiment shown in FIG. 2 in that the shaft-cooling space 114' does not extend between the first connecting shaft 52 and the second connecting shaft 54, but around the second connecting shaft 54, namely between the disc of the second turbine rotor 18 and the second connecting shaft 54, so that the first cooling circuit 110' cools the second connecting shaft 54 and the second turbine rotor 18.

Of course, the disclosure is by no means limited to the illustrative, non-limiting embodiments described. Thus, the illustrated embodiments represent a three-flow turbomachine. Naturally, the disclosure also applies to a two-flow turbomachine. In such a case, the turbomachine is devoid of the tertiary annular flow path 30, the second impeller 32, the tertiary flow 35 and the fairing 39.

The invention claimed is:

1. A turbomachine for aircraft, the turbomachine being intended to propel, towards a downstream side, a flow of air entering from an upstream side, said turbomachine having a primary annular flow path and a cold flow channel extending around the primary annular flow path, said turbomachine comprising:
   an impeller arranged upstream of a first annular wall, the first annular wall separating the primary annular flow path from the cold flow channel,
   in the primary annular flow path, from upstream to downstream, a compressor, a combustion chamber, a first turbine and a second turbine, the compressor having an input stage and an output stage, the first turbine having a first turbine rotor and the second turbine having a second turbine rotor,
   a shaft assembly for rotating the compressor and the impeller about an axis of rotation, the shaft assembly comprising a first connecting shaft and a second connecting shaft, the first connecting shaft being rotatably connected to the second turbine rotor, the second connecting shaft being rotatably connected to the first turbine rotor and rotating the compressor,
   an inter-turbine stator disposed between the first turbine and the second turbine, the inter-turbine stator comprising a plurality of arms extending between an inner end and an outer end, the plurality of arms extending through the primary annular flow path,
   a cooling assembly comprising a first cooling circuit having successively:
      a first cooling inlet located between the impeller and the compressor,
      a first passage extending through the primary annular flow path into the inter-turbine stator from the inner end to the outer end, and
      a first cooling outlet extending into the cold flow channel.

2. The turbomachine according to claim 1 wherein the cooling assembly further comprises a second cooling circuit, the first cooling circuit and the second cooling circuit are separate, the first cooling circuit being fluidly sealed with respect to the second cooling circuit, the second cooling circuit comprises successively:
   a second cooling inlet located downstream of the inlet stage of the compressor,
   a second passage extending through the primary annular flow path in the inter-turbine stator from the outer end to the inner end, a second cooling outlet extending into the primary annular flow path, downstream of the first turbine.

3. The turbomachine according to claim 2 wherein:
each arm has an internal space,
the inter-turbine stator comprises a duct extending into the internal space, and
one of the first circuit and the second circuit extends inside the duct, the other of the first circuit and the second circuit extends outside the duct and in contact with the duct, so that the duct acts as a heat exchanger.

4. The turbomachine according to claim 3 wherein the duct has fins.

5. The turbomachine according to claim 3 wherein the duct has protrusions for creating flow turbulence.

6. The turbomachine according to claim 3 wherein the inter-turbine stator comprises a plurality of ducts extending into the internal space and acting as a heat exchanger.

7. The turbomachine according to claim 2, wherein:
the plurality of arms comprises first arms and second arms,
the first cooling circuit passes through the first arms,
the second cooling circuit passes through the second arms, and
the first arms are separate from the second arms and arranged between the second arms.

8. The turbomachine according to claim 2 wherein the second cooling circuit comprises a second cooling space extending in contact with the second turbine rotor to cool it.

9. The turbomachine according to claim 1 wherein the first circuit comprises, between the first cooling inlet and the first passage, a first cooling space extending in contact with the second connecting shaft.

10. The turbomachine according to claim 9 wherein the cooling space extends between the first connecting shaft and the second connecting shaft.

11. The turbomachine according to claim 1 wherein the first circuit pressurises a bearing lubrication chamber for guiding the first connecting shaft and the second connecting shaft.

12. The turbomachine according to claim 1 wherein the impeller is rotated by the first connecting shaft.

13. The turbomachine according to claim 1 wherein:
the compressor is a high-pressure compressor,
the turbomachine further comprises a low-pressure compressor, and
the first cooling inlet is located between the low-pressure compressor and the high-pressure compressor.

14. The turbomachine according to claim 13 wherein the low-pressure compressor is rotated by the first connecting shaft.

* * * * *